US012389367B2

(12) United States Patent
Greenwald et al.

(10) Patent No.: US 12,389,367 B2
(45) Date of Patent: Aug. 12, 2025

(54) MOBILE APPLICATION REDIRECT BY WAY OF TRIGGERED PUSH NOTIFICATIONS

(71) Applicant: Cray Pay Inc., Mesa, AZ (US)

(72) Inventors: Marshall Robert Greenwald, Gilbert, AZ (US); Jonathan Jeremy Cardella, Boise, ID (US); Vladimir Malkhazovich Dzhidzhiyeshvili, Boise, ID (US)

(73) Assignee: IONIA, INC., Mesa, AZ (US)

( * ) Notice: Subject to any disclaimer, the term of this patent is extended or adjusted under 35 U.S.C. 154(b) by 568 days.

(21) Appl. No.: 17/721,046

(22) Filed: Apr. 14, 2022

(65) Prior Publication Data

US 2022/0338160 A1 Oct. 20, 2022

Related U.S. Application Data

(60) Provisional application No. 63/175,509, filed on Apr. 15, 2021.

(51) Int. Cl.
H04W 68/00 (2009.01)
G06F 16/955 (2019.01)
(Continued)

(52) U.S. Cl.
CPC ...... *H04W 68/005* (2013.01); *G06F 16/9566* (2019.01); *H04L 63/0272* (2013.01); *H04W 88/182* (2013.01)

(58) Field of Classification Search
CPC .............. H04W 68/005; H04W 88/182; G06F 16/9566; H04L 63/0272; H04L 67/55
See application file for complete search history.

(56) References Cited

U.S. PATENT DOCUMENTS 8,036,944 B2 10/2011 Lee et al.
8,301,495 B2 10/2012 Mason
(Continued)

FOREIGN PATENT DOCUMENTS

CA 3118369 A1 * 4/2020 ............ H04L 67/02
WO 2012162568 A1 11/2012

OTHER PUBLICATIONS

Rayome, Alison DeNisco et al. "21 browser extensions and apps that'll save you money this holiday season". https://www.cnet.com/tech/services-and-software/browswer-extensions-apps-save-money-holiday-season/, retrieved on Mar. 21, 2022, 8 pages.
(Continued)

*Primary Examiner* — Margaret G Webb
(74) *Attorney, Agent, or Firm* — MCDONNELL BOEHNEN HULBERT & BERGHOFF LLP

(57) ABSTRACT

An example embodiment may involve receiving, by a first mobile application executing on a mobile device, a selection of a uniform resource locator (URL) related to an application server device; transmitting, by the first mobile application, a first request to the application server device, wherein the first request is directed to the application server device by way a virtual private network (VPN) or proxy session between the mobile device and a VPN server device or proxy server device, and wherein the first request contains the URL; receiving, by the mobile device, a push notification from a scanning server device associated with the VPN server device or proxy server device, wherein the push notification contains the URL or a different URL; providing, by the mobile device, the URL from the push notification to a second mobile application executing on the mobile device; and transmitting, by the second mobile application, a second request to the application server device, wherein the second request contains the URL from the push notification.

18 Claims, 9 Drawing Sheets

(51) Int. Cl.
*H04L 9/40* (2022.01)
*H04W 88/18* (2009.01)

(56) References Cited

U.S. PATENT DOCUMENTS

| | | | |
|---|---|---|---|
| 8,725,589 | B1 | 5/2014 | Skelding et al. |
| 8,924,246 | B1 | 12/2014 | Chen et al. |
| 9,015,066 | B2 | 4/2015 | Sciponi et al. |
| 9,092,613 | B2 * | 7/2015 | Martini ............... H04W 12/069 |
| 9,117,242 | B1 | 8/2015 | Ellis et al. |
| 9,160,729 | B2 | 10/2015 | Lyman et al. |
| 9,524,198 | B2 | 12/2016 | Doshi |
| 10,074,081 | B1 | 9/2018 | Radlow et al. |
| 10,169,770 | B2 | 1/2019 | Glazier et al. |
| 10,229,427 | B2 | 3/2019 | Glazier |
| 10,334,066 | B2 * | 6/2019 | Krishnan ............... H04L 67/02 |
| 10,389,831 | B2 | 8/2019 | Somani et al. |
| 10,395,234 | B1 | 8/2019 | Greenwald et al. |
| 10,402,845 | B2 | 9/2019 | Glazier et al. |
| 10,540,671 | B2 | 1/2020 | Glazier et al. |
| 10,643,230 | B2 | 5/2020 | Glazier et al. |
| 10,733,622 | B1 | 8/2020 | Glazier et al. |
| 11,076,012 | B2 | 7/2021 | Ko et al. |
| 2002/0095333 | A1 | 7/2002 | Jokinen et al. |
| 2004/0215507 | A1 | 10/2004 | Levitt et al. |
| 2006/0178932 | A1 | 8/2006 | Lang |
| 2008/0120194 | A1 | 5/2008 | Juras et al. |
| 2009/0030779 | A1 | 1/2009 | Tollinger et al. |
| 2009/0144152 | A1 | 6/2009 | Wilson |
| 2009/0171804 | A1 | 7/2009 | Lee et al. |
| 2009/0235359 | A1 * | 9/2009 | Abdulhayoglu .... H04L 63/1433 726/25 |
| 2011/0126287 | A1 * | 5/2011 | Yoo ...................... G06F 21/567 726/24 |
| 2011/0231344 | A1 | 9/2011 | Hall |
| 2011/0295705 | A1 | 12/2011 | Kasmei |
| 2012/0066043 | A1 | 3/2012 | Carmichael et al. |
| 2012/0088523 | A1 | 4/2012 | Shirakawa et al. |
| 2012/0203572 | A1 | 8/2012 | Christensen |
| 2012/0203697 | A1 | 8/2012 | Morgan et al. |
| 2012/0248755 | A1 | 10/2012 | Mulcahy |
| 2012/0253902 | A1 | 10/2012 | Carney, II |
| 2013/0024360 | A1 | 1/2013 | Ballout |
| 2013/0041768 | A1 | 2/2013 | Llach |
| 2013/0138563 | A1 | 5/2013 | Gilder et al. |
| 2013/0144702 | A1 | 6/2013 | Tabor et al. |
| 2013/0151401 | A1 | 6/2013 | Sciponi et al. |
| 2013/0173389 | A1 | 7/2013 | Page et al. |
| 2013/0253832 | A1 | 9/2013 | Nallu et al. |
| 2013/0304605 | A1 | 11/2013 | Glass et al. |
| 2013/0304642 | A1 | 11/2013 | Campos |
| 2014/0052607 | A1 | 2/2014 | Park |
| 2014/0058902 | A1 | 2/2014 | Taylor et al. |
| 2014/0067671 | A1 | 3/2014 | DeHaven et al. |
| 2014/0136349 | A1 | 5/2014 | Dave et al. |
| 2014/0143089 | A1 | 5/2014 | Campos et al. |
| 2014/0195425 | A1 | 7/2014 | Campos et al. |
| 2014/0207569 | A1 | 7/2014 | Lam et al. |
| 2014/0207598 | A1 | 7/2014 | Lam et al. |
| 2014/0214567 | A1 | 7/2014 | Llach et al. |
| 2014/0214663 | A1 | 7/2014 | Wolfe |
| 2014/0236823 | A1 | 8/2014 | Lee |
| 2014/0304147 | A1 | 10/2014 | Wolff |
| 2014/0358770 | A1 | 12/2014 | Coyne |
| 2015/0017616 | A1 | 1/2015 | Rachitsky et al. |
| 2015/0081533 | A1 | 3/2015 | Gupta et al. |
| 2015/0220118 | A1 | 8/2015 | Kwak et al. |
| 2015/0220119 | A1 | 8/2015 | Seo et al. |
| 2015/0227913 | A1 | 8/2015 | Ballout |
| 2015/0287021 | A1 | 10/2015 | Itwaru |
| 2015/0348006 | A1 | 12/2015 | Taveau et al. |
| 2015/0371225 | A1 | 12/2015 | Zhao |
| 2016/0012417 | A1 | 1/2016 | Mizon |
| 2016/0036799 | A1 | 2/2016 | Lyman et al. |
| 2016/0086249 | A1 | 3/2016 | Zamer |
| 2016/0335608 | A1 | 11/2016 | Balasubramani et al. |
| 2016/0350741 | A1 | 12/2016 | Reen |
| 2016/0371668 | A1 | 12/2016 | Priebatsch et al. |
| 2017/0011387 | A1 | 1/2017 | Lennon et al. |
| 2017/0237736 | A1 | 8/2017 | Eber |
| 2018/0293601 | A1 | 10/2018 | Glazier |
| 2019/0014386 | A1 * | 1/2019 | Maher ................ H04N 21/8549 |
| 2019/0347644 | A1 | 11/2019 | Greenwald et al. |
| 2020/0036805 | A1 * | 1/2020 | Ishida ................... H04L 67/146 |
| 2020/0082423 | A1 | 3/2020 | Glazier et al. |
| 2020/0364734 | A1 | 11/2020 | Glazier et al. |

OTHER PUBLICATIONS

"American Airlines AAdvantage eShopping—Chrome Web Store". https://chrome.google.com/webstore/detail/american airlines-aadvant/dcdiajifnnbipfljbggcbbheipfdmgpo?hl=en-US, retrieved on Mar. 21, 2022, 7 pages.

Exxon Mobile Corporation, "Mobile Payment with Speedpass+," http://www.exxon.com/speedpassplus, retrieved Nov. 20, 2015, 6 pages.

Google, Inc., "Android Pay—Android Apps on Google Pay," http://play.google.com/store/apps/details?id=com.google.android.apps.w . . . , retrieved Nov. 20, 2015, 4 pages.

Starbucks, "Starbucks app for iPhone—Now Serving Great Features," http://www.starbucks.com/coffeehouse/mobile-apps/mystarbucks, retrieved Nov. 20, 2015, 2 pages.

* cited by examiner

MOBILE APPLICATION REDIRECT BY WAY OF TRIGGERED PUSH NOTIFICATIONS

CROSS-REFERENCE TO RELATED APPLICATION

This application claims priority to U.S. provisional patent application No. 63/175,509, filed Apr. 15, 2021, which is hereby incorporated by reference in its entirety.

BACKGROUND

The ubiquity of mobile applications (apps), whether dedicated native apps or facilitated by way of mobile web browsers, has become undeniable. Nonetheless, there are situations in which certain functions, features, communications, or types of transactions, are better facilitated by some apps than others. However, once a user has initiated use of one app for a specific function, the user typically completes the function using that app even if its built-in support for the function is limited.

SUMMARY

The embodiments herein facilitate redirecting a mobile device to use one app over another in certain situations. For example, a user may begin using a first app on their mobile device to access an application server. The mobile device may be configured to steer the network traffic related to the first app through a virtual private network (VPN) gateway or proxy server. On the egress side of the VPN gateway or proxy server, a scanning server parses at least the headers of this network traffic for Internet protocol (IP) addresses and/or uniform resource locators (URLs). When the scanning server determines that the mobile device is accessing an IP address or URL of the application server, the scanning server transmits a push notification to the mobile device, where the push notification contains the URL (or a shortened version of the URL or a different URL). The push notification may be direct communication between the scanning server and the mobile device, a text message, or an email for example. In response to receiving the push notification, the mobile device may display an indication of its receipt (e.g., a device notification, popup window, etc.). Upon activation by the user, the displayed notification may cause a second app to launch and access the URL from the push notification (i.e., the URL that is carried within the push notification). The transaction between the second app and the server associated with the URL from the push notification may exhibit a different character than transactions between the first app and the application server, provide certain improved functionality, or at least facilitate a different experience.

Accordingly, a first example embodiment may involve receiving, by a first mobile application executing on a mobile device, a selection of a uniform resource locator (URL) related to an application server device. The first example embodiment may also involve transmitting, by the first mobile application, a first request to the application server device, wherein the first request is directed to the application server device by way a virtual private network (VPN) or proxy session between the mobile device and a VPN server device or proxy server device, and wherein the first request contains the URL. The first example embodiment may also involve receiving, by the mobile device, a push notification from a scanning server device associated with the VPN server device or proxy server device, wherein the push notification contains the URL or a different URL. The first example embodiment may also involve providing, by the mobile device, the URL from the push notification to a second mobile application executing on the mobile device. The first example embodiment may also involve transmitting, by the second mobile application, a second request to the application server device, wherein the second request contains the URL from the push notification.

A second example embodiment may involve receiving, by a mobile device, a push notification from a scanning server device, wherein the scanning server device is associated with a virtual private network (VPN) server device or a proxy server device, wherein the scanning server device detected a uniform resource locator (URL) in a first request transmitted by a first mobile application executing on the mobile device, wherein the URL is related to an application server device, and wherein the push notification contains the URL or a different URL. The second example embodiment may also involve providing, by the mobile device, the URL from the push notification to a second mobile application executing on the mobile device. The second example embodiment may also involve transmitting, by the second mobile application, a second request to the application server device, wherein the second request contains the URL from the push notification.

A third example embodiment may involve receiving, by a scanning server device, a request from a first mobile application executing on a mobile device, wherein the request is directed to an application server device, and wherein the request contains a uniform resource locator (URL) related to the application server device. The third example embodiment may also involve determining, by the scanning server device, that a destination IP address in a packet header of the request is associated with the application server device. The third example embodiment may also involve, possibly in response to determining that the destination IP address is associated with the application server device, transmitting, to the mobile device, a push notification containing the URL or a different URL.

In a fourth example embodiment, an article of manufacture may include a non-transitory computer-readable medium, having stored thereon program instructions that, upon execution by a computing system, cause the computing system to perform operations in accordance with the first, second, and/or third example embodiment.

In a fifth example embodiment, a computing system may include one or more processors, as well as memory and program instructions. The program instructions may be stored in the memory, and upon execution by the one or more processors, cause the computing system to perform operations in accordance with the first, second, and/or third example embodiment.

In a sixth example embodiment, a system may include various means for carrying out each of the operations of the first, second, and/or third example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

Figure 1:
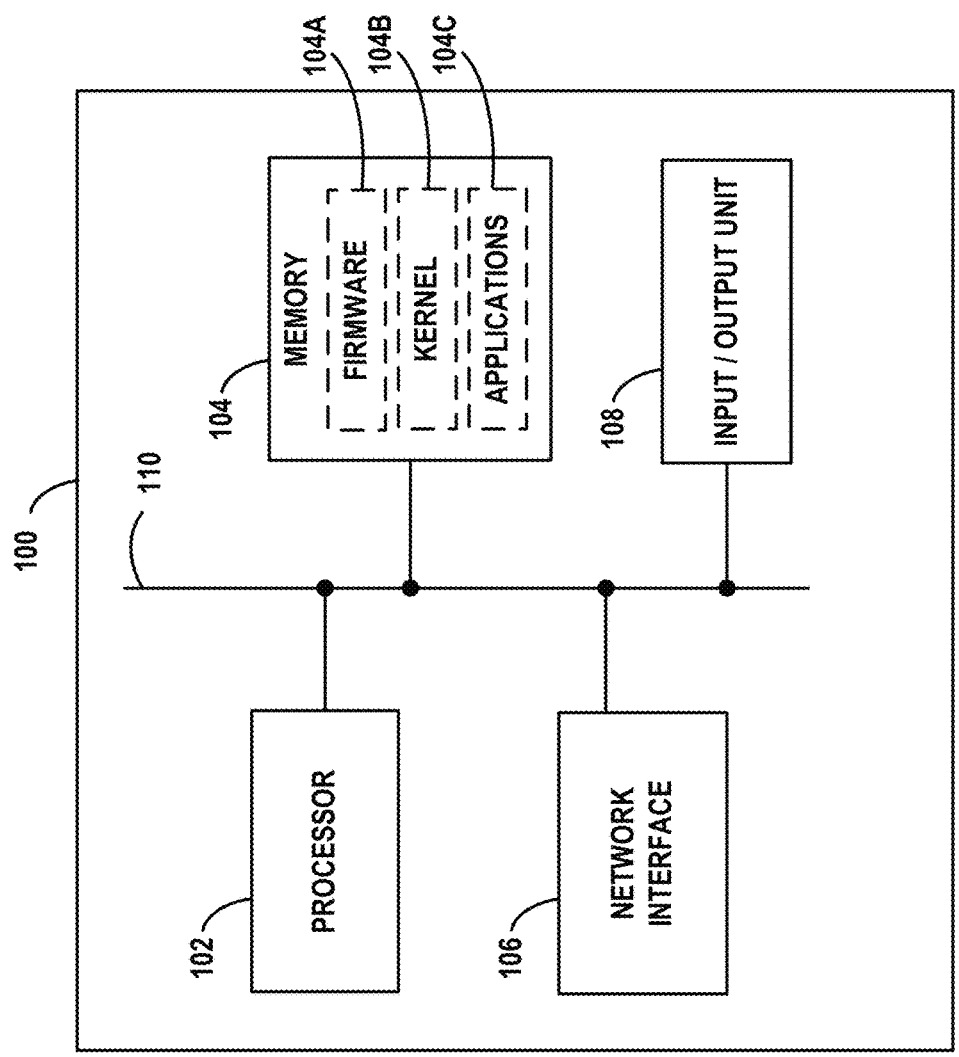
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

Client device implementations may involve a screen (e.g. a touchscreen) capable of receiving user input and providing graphical displays of app output. Such client devices may also be capable of sending and receiving text messages and various other types of communications.

FIG. 1 is an example embodiment of a client device. FIG. 1 is also an example embodiment of a server device, and may be combined with the embodiments of FIG. 2 to form cloud-based server deployments.

In FIG. 1, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support a distributed architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
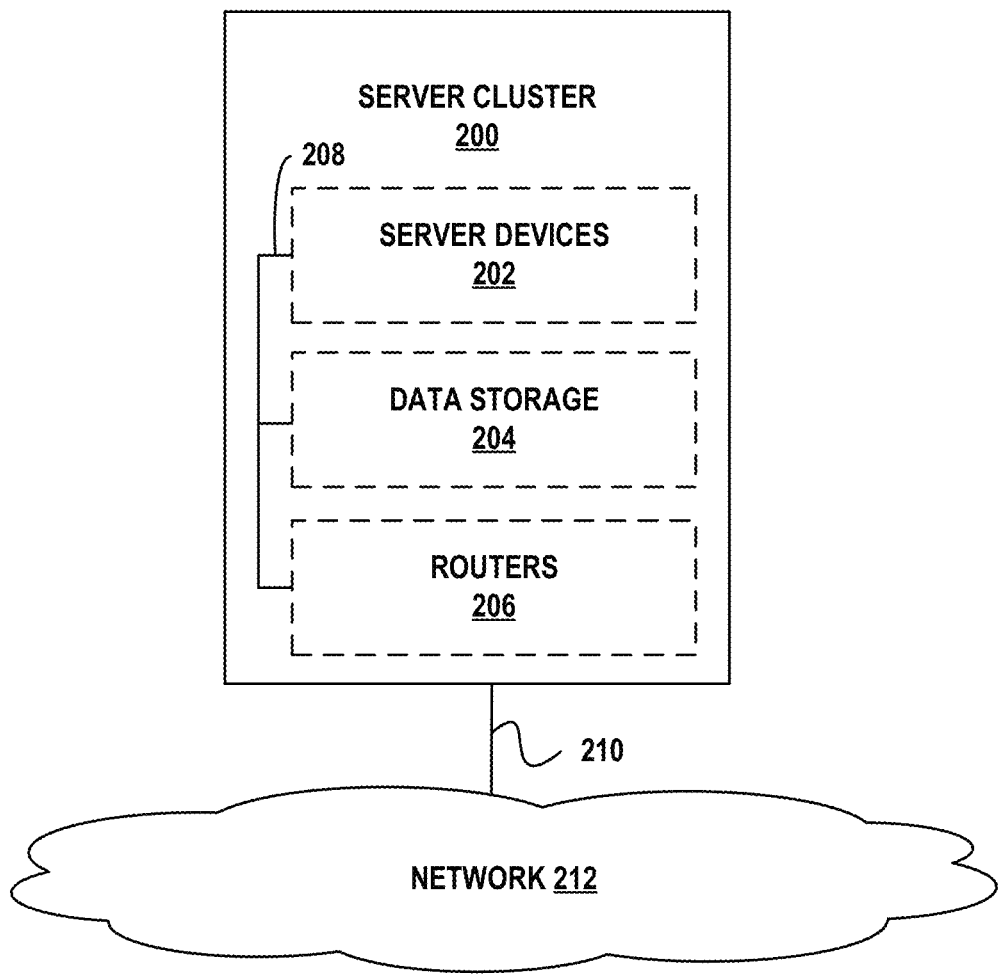
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

II. Example Message Flows

Figure 3A:
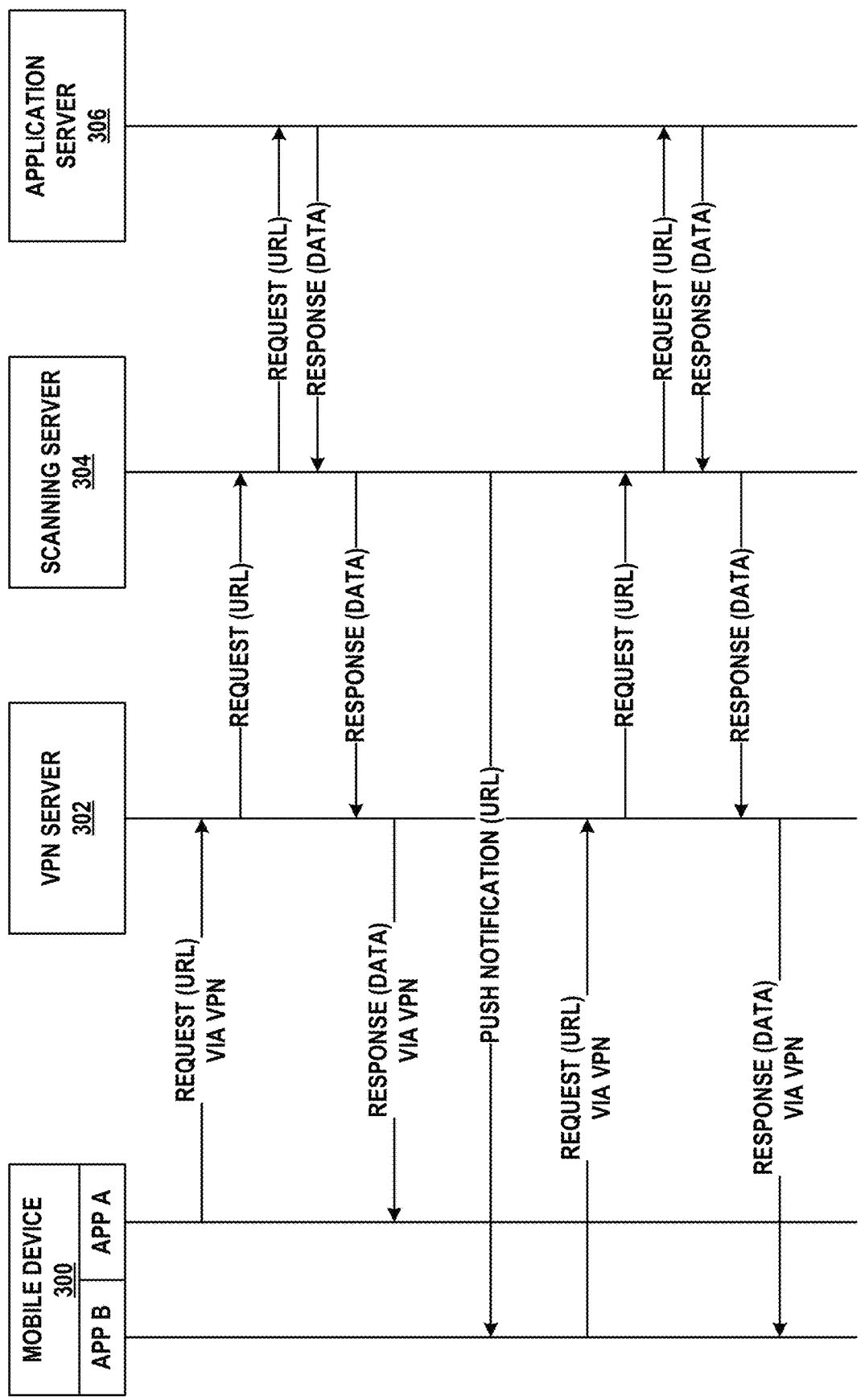
FIG. 3A is a message flow diagram, in accordance with example embodiments.

FIG. 3A depicts a message flow in accordance with example embodiments. The message flow involves mobile device 300 (which can be embodied as computing device 100) that is configured to execute app A and app B. These applications may be native applications downloaded or otherwise provided on mobile device 300.

Further, mobile device 300 may be equipped with virtual private network (VPN) client software configured to initiate and manage VPN sessions between mobile device 300 and VPN server 302. As an example, the VPN sessions may operate in accordance with a security protocol such as Internet Protocol Security (IPSEC) or Transport Layer Security (TLS), encrypting and/or authenticating all traffic between mobile device 300 and VPN server 302. In some alternatives, the VPN sessions may apply to all traffic that mobile device 300 transmits to or receives from other correspondent nodes on the Internet or other networks (e.g., application server 306). In other alternatives, the VPN sessions may only apply to traffic that specific applications on mobile device 300 transmit to or receive from other correspondent nodes on the Internet. For example, a VPN session may apply to traffic to and from app A but not traffic to or from app B.

VPN server 302 is a termination point of outbound VPN traffic originating at mobile device 300 and an originating point for inbound VPN traffic terminating at mobile device 300. Thus, VPN server 302 may decapsulate outbound traffic by removing VPN headers before the outbound traffic is forwarded on to correspondent nodes. VPN server 302 may also encapsulate inbound traffic from correspondent nodes by encapsulating it in VPN headers before it is forwarded on to mobile device 300. VPN server 302 may engage in other VPN-related processing as well.

In alternative embodiments, VPN server 302 may be replaced by a proxy server that relays network traffic between mobile device 300 and correspondent nodes.

Mobile device 300 may be configured to transmit at least some of its outbound traffic by way of the proxy server. The proxy server may receive this outbound traffic and forward it toward the intended destination. Likewise, the proxy server may receive at least some inbound traffic destined for the mobile device 300, and forward it to mobile device 300.

Scanning server 304 may be a server device configured to parse outbound traffic between mobile device 300 and correspondent nodes. Scanning server 304 may attempt to identify the destination of the outbound traffic. For example, scanning server 304 may consider the destination IP address in the IP headers of the outbound traffic and/or the destination port numbers in the TCP or UDP headers of the outbound traffic. In some cases, scanning server 304 may parse the packets of the outbound traffic for destination URLs.

Regardless of whether IP addresses, port numbers, URLs, and/or other destination identifiers are considered, scanning server 304 may have a list of destination identifiers of interest. This list can be manually or automatically configured to include destinations for which it is preferable to have users access via app B rather than app A. One of these destinations may be application server 306.

When scanning server 304 identifies outbound traffic containing a destination identifier in the list, it transmits a push notification to mobile device 300. The push notification may be an application-specific notification (e.g., transmitted from scanning server 304 to app B), a text message, or an email for example. The push notification may contain the URL found in the outbound traffic (if applicable). If a URL is not found in the outbound traffic, scanning server 304 may infer a URL from the destination IP address. For example, if the IP address 12.176.15.232 is known to be associated with the URL www.example.com/store, this URL would be provided to app B. These associations between IP addresses and URLs may also be stored in the list of destination identifiers.

In alternative or additional embodiments, scanning server 304 may parse the packets of the outbound traffic for a source application identifier (e.g., whether app A or app B was used to generate the outbound traffic). Scanning server 304 might only transmit a push notification if a certain app (e.g., app A) is being used, and might refrain from transmitting a push notification with another app (e.g., app B) is being used.

In some embodiments, scanning server 304 may be co-located or combined with VPN server 302 so that scanning server 304 has access to the outbound traffic from VPN server 302. Where a proxy server replaces VPN server 302, scanning server 304 may be co-located or combined with the proxy server. But other arrangements are possible.

Application server 306 may be any type of server device that supports one or more applications. Thus, application server 306 may be an ecommerce server, telephony server, videoconferencing server, web server, gaming server, social networking server, email server, entertainment server, or some other type of server.

Figure 3B:
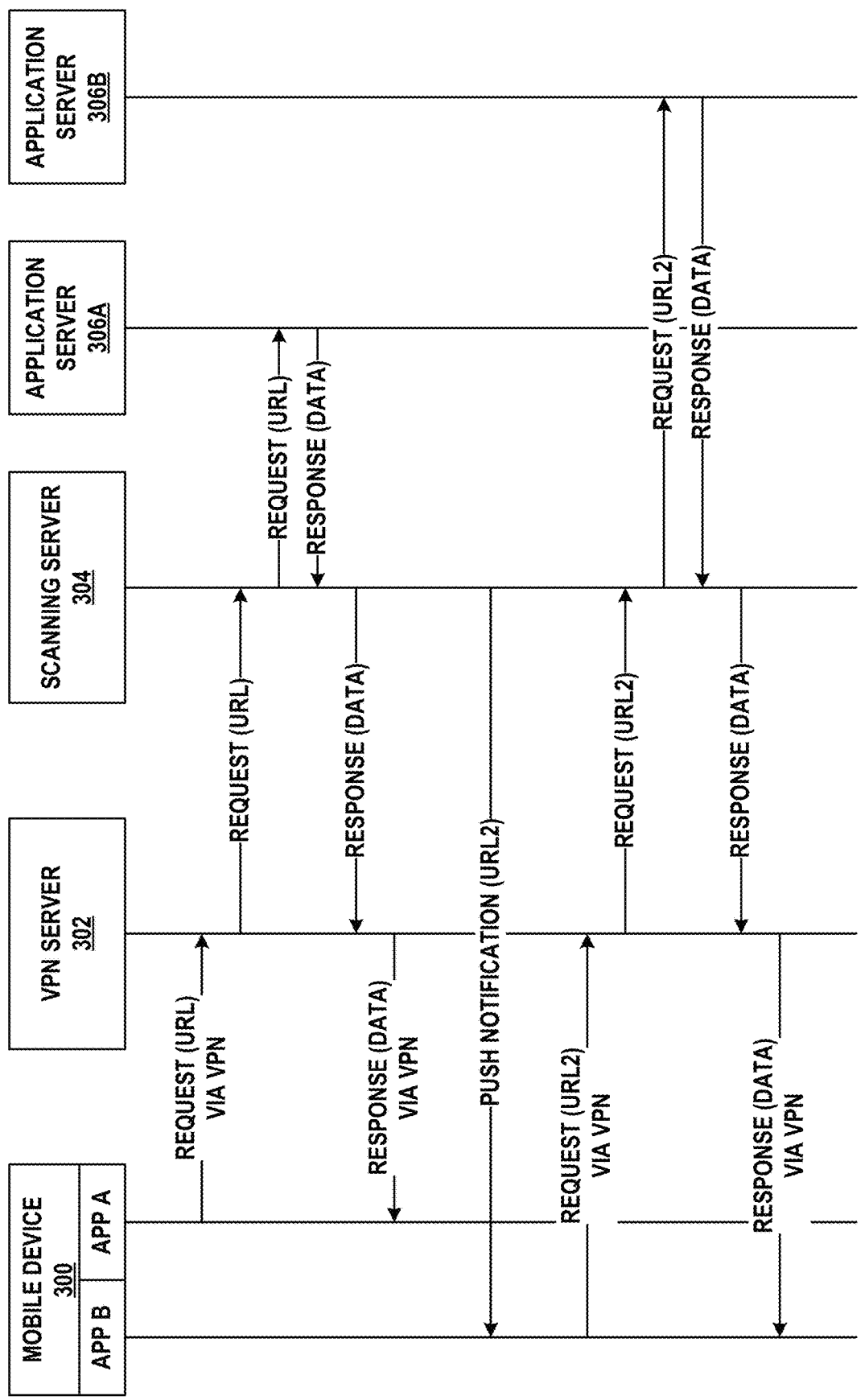
FIG. 3B is a message flow diagram, in accordance with example embodiments.

FIG. 3B depicts a similar scenario as that of FIG. 3A, but scanning server 304 redirects mobile device 300 to a different URL. Notably, in response to receiving the request related to a particular URL or IP address of application server 306A and determining that this URL or IP address is in the list of destination identifiers, scanning server 304 may redirect either app A or app B to URL2. As shown, scanning server 304 transmits a push notification containing URL2 to mobile device 300. This push notification may be routed to and/or ultimately consumed by app A or app B. In FIG. 3B, it is routed to app B which is then triggered to request data at URL2 from application server 306B.

One of the advantages of the arrangement and messaging depicted in FIGS. 3A and 3B is to redirect mobile devices to use preferred applications with specific application servers. For instance, application server 306 may have a web-based interface accessible by way of a web browser (e.g., app A). However, application server 306 may also have a dedicated native app (e.g., app B) through which it can be interfaced for a better user experience. The embodiments herein may involve application server 306 detecting when the web browser is being used (e.g., by viewing the User-Agent header of an HTTP request) and redirecting mobile device 300 into using the native app instead. In another example, there may be two different native apps that can access application server 306, but one (e.g., app B) has an improved user experience over that of another (e.g., app A). For example, app B may offer the user more features, a better user interface, or more options for transactions with application server 306. The embodiments herein may also involve application server 306 detecting when app A is being used (e.g., by viewing a header or metadata of request or by way of pattern recognition applied to the request) and redirect mobile device 300 into using app B instead. As noted above, scanning server 304 might refrain from transmitting a push notification when app B is being used because app B is the preferred app.

Alternatively or additionally, app B might be configured to automatically insert discount codes or coupons into an online checkout process. For example, app A might be a web browser or native application with which the user navigates to an ecommerce site and selects an item. The push notification may redirect the mobile device to use app B to access the same or a different site that offers the item for sale. Further, app B may determine (e.g., from URL2) the nature of the item (e.g., brand and product) and then automatically apply a coupon code during checkout. In some cases, app B may offer the user an opportunity to purchase a gift card (e.g., at a discount) that can be immediately or later applied to the ecommerce transaction involving URL2. App B need not be aware of the item being purchases because the coupon code or gift card may be per-site or specific to the party providing the site and therefore be applicable to all purchases made by way of a particular web site.

Another advantage to these embodiments is the use of the VPN or proxy server to centralize the outbound traffic. This permits the scanning performed by scanning server 304 to be centralized and made efficient (e.g., scanning server 304 scanning message header information only instead of the entire content of each message). Alternatives that place the scanning on mobile device 300 would use a significant amount of processing power, as all outbound traffic would need to be scanned. This could dramatically reduce the battery life of mobile device 300. Further, some mobile operating systems, such as IOS® may prevent certain types of scanning from taking place. Moreover, centralized scanning allows the list of destination identifiers to be easily updated, perhaps even several times per day, without having to push an update to mobile device 300. Nonetheless, embodiments in which the scanning takes place on the mobile device are possible (e.g., the device could set up a local VPN server, and push data to itself with a local VPN client, among other possibilities).

III. Example Transaction Monitor

This section provides a further example embodiment in more detail. Notably, this embodiment is just an example provided for illustrative purposes and the disclosure herein can be used in other ways and for other purposes.

A transaction monitor may be implemented in the network (e.g., in scanning server 304) as follows. The transaction monitor examines web URLs and (when possible) mobile apps engaged by the user (e.g., by way of VPNs or proxy servers). It checks the app or website against a list of participating web sites. The transaction monitor triggers a notice for savings opportunities when savings opportunities are identified (e.g., by way of a coupon app). It allows the user to shop through a preferred app (e.g., a coupon app or cashback app). The user may purchase a gift card, then enters the code at checkout.

The mobile application (e.g., app B) installed by the user may provide one or more of the following services: (i) a utility for browsing the web, specifically supported ecommerce websites, essentially a built-in browser, and (ii) a wallet allowing users to purchase a gift card at a discount and apply it during their online shopping checkout flow.

The user experience may be as follows. The user installs the preferred app on their mobile device. The app could be named "Deal Hunter" or "Savings Monitor" or anything that communicates what it does. Later, the user might click an ad from some ecommerce site (e.g., bestbuy.com on Instagram), or browse to the site on their preferred web browser. Scanning server 304 recognizes the intended destination URL and transmits a push notification to the user's mobile device. When the user clicks on the indication of the push notification, the same URL will be transferred to the preferred app where the user can continue browsing the ecommerce site. Meanwhile, a banner appears on the preferred app reminding the user of an offer for savings, e.g., 10% off. In response to clicking the banner, the user is guided to purchase the gift card, and on continuing the checkout on the ecommerce site, the preferred app assists the user to insert the gift card into the check-out flow. Alternatively, the push notification may provide another, different URL and the user may be redirected to the web site associated with this URL.

These embodiments may focus on use of a VPN or proxy server rather than ad blocker implementations, because ad blockers are a specific filter type that IOS® allows, which cannot be extended beyond the function of blocking. VPNs and proxy servers, on the other hand, can route the traffic to any server device on the Internet, allowing review of the target URLs/IP addresses and determine the intended request. The VPN server/proxy server or an associated scanning server would parse the data and determine if the URL the user is going to is supported.

Figure 4:
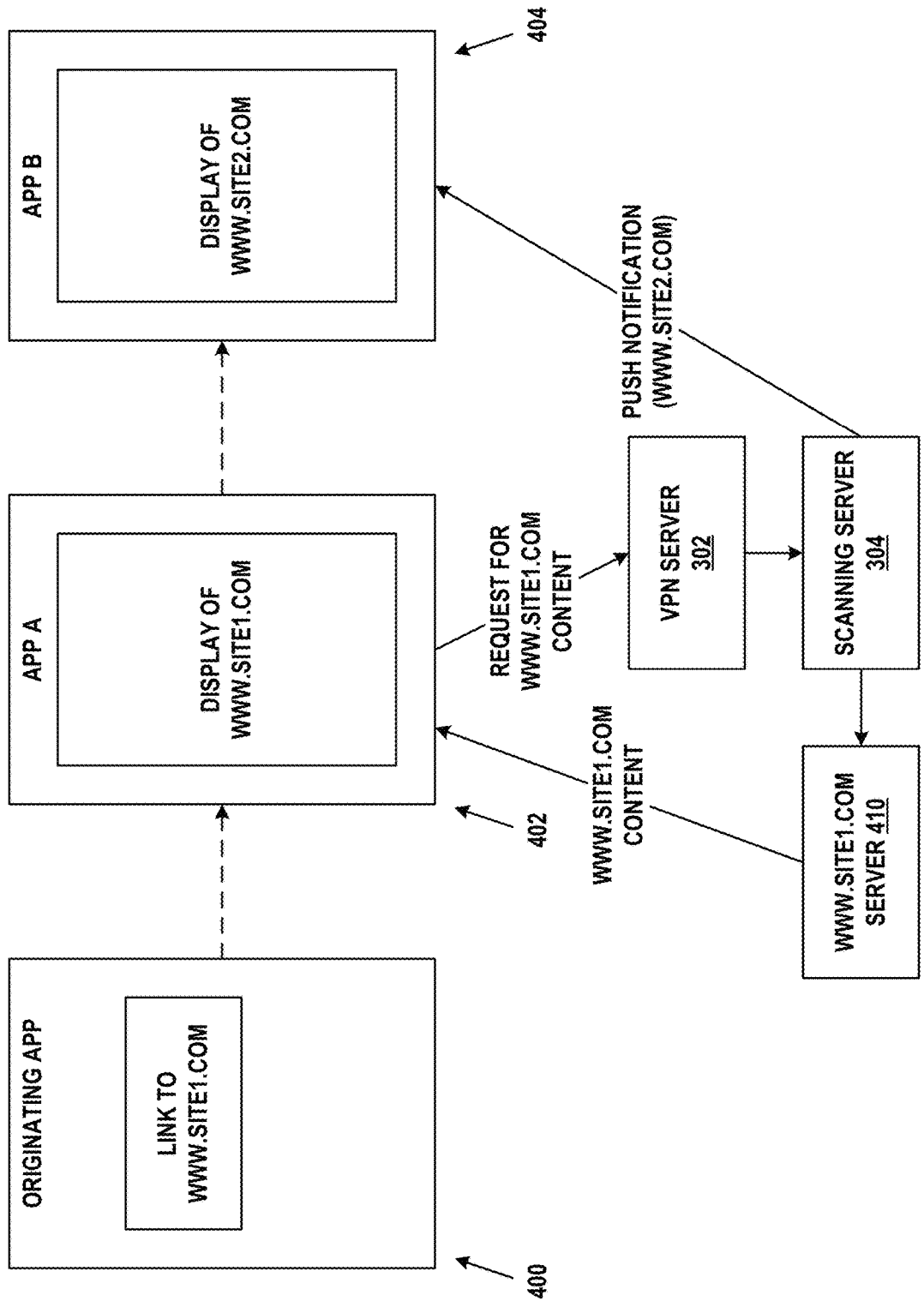
FIG. 4 depicts a transaction, in accordance with example embodiments.

Such an arrangement appears in FIG. 4. A VPN-like application, when enabled, acts as a proxy. Sending traffic through the VPN and scanning servers allows monitoring of the sites accessed and identification of the sites in the list. Once outbound traffic destined to such a site is identified, push notifications can be transmitted to the originating mobile device. The user may need to enable the application permissions to receive the push notifications. Of course, the VPN of FIG. 4 could be replaced by a proxy server arrangement.

Particularly, blocks 402, 402, and 404 represent graphical user interfaces of a mobile device arranged to carry out the embodiments herein. At block 400, the user is interacting with an originating app (e.g., a social media app) and is presented with a link to www.site1.com. At block 402, the user has actuated this link and is interacting with app A (e.g., a web browser) which requests and displays content from www.site1.com.

In doing so, app A may transmit a request for the content of www.site1.com. This request may traverse a VPN to VPN server 302, and the get routed to scanning server 304 before ultimately arriving at www.site1.com server 410. In response, server 410 may transmit the requested content of www.site1.com to app A, and app A may display this content (as shown in block 402.

Possibly in parallel to this, scanning server 304 may determine that an address of www.site1.com is on a list of destination identifiers, but with www.site2.com as a preferred alternative. Accordingly, scanning server 304 may transmit a push notification to the mobile device containing www.site2.com, causing the mobile device to invoke app B to request and receive content from www.site2.com. App B may display this content, as shown in block 404. Alternatively, app B may display some of all of this content as a popup or overlay atop the display of app A.

Figure 5:
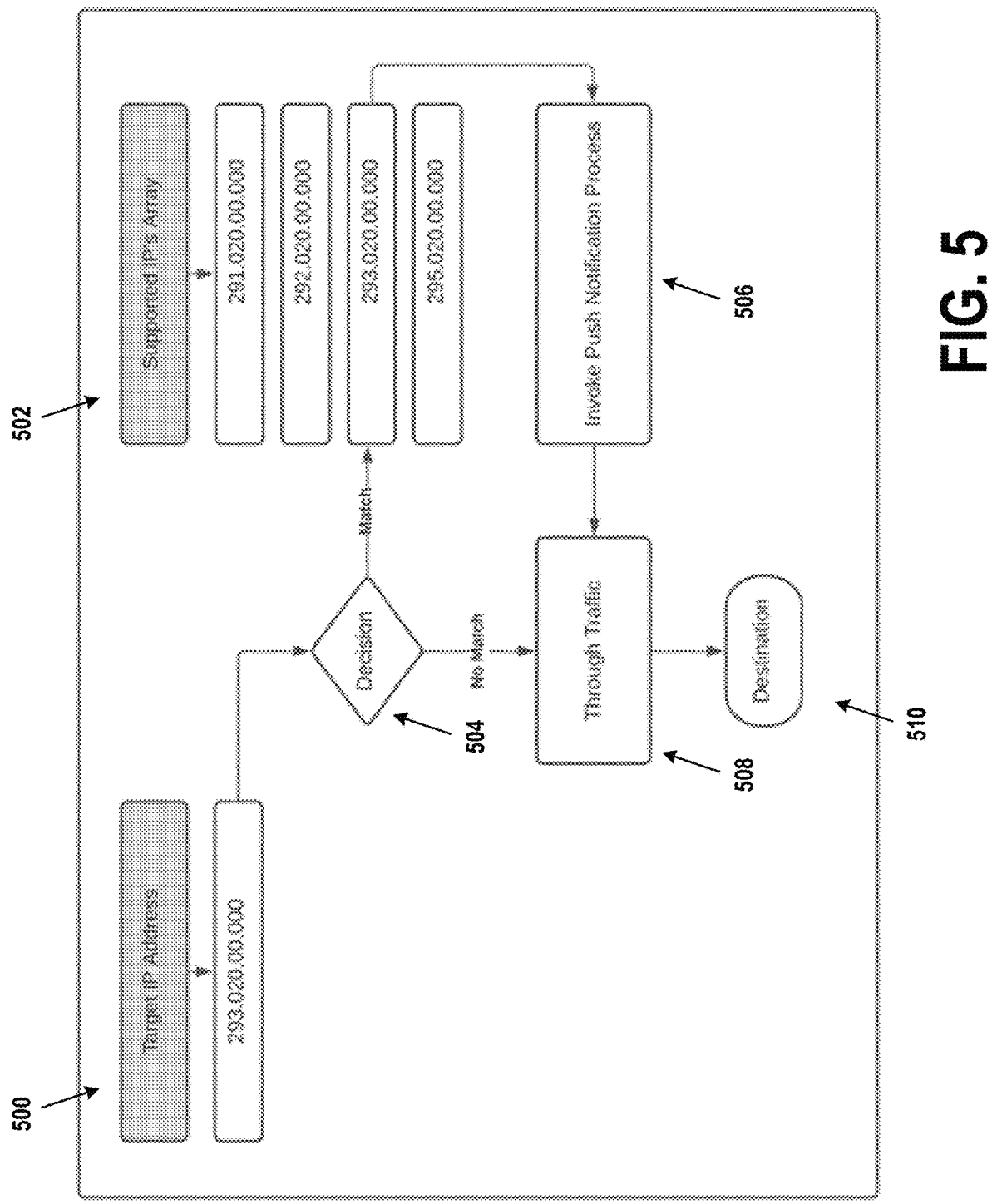
FIG. 5 depicts invoking a push notification process based on a target IP address, in accordance with example embodiments.
Figure 6A:
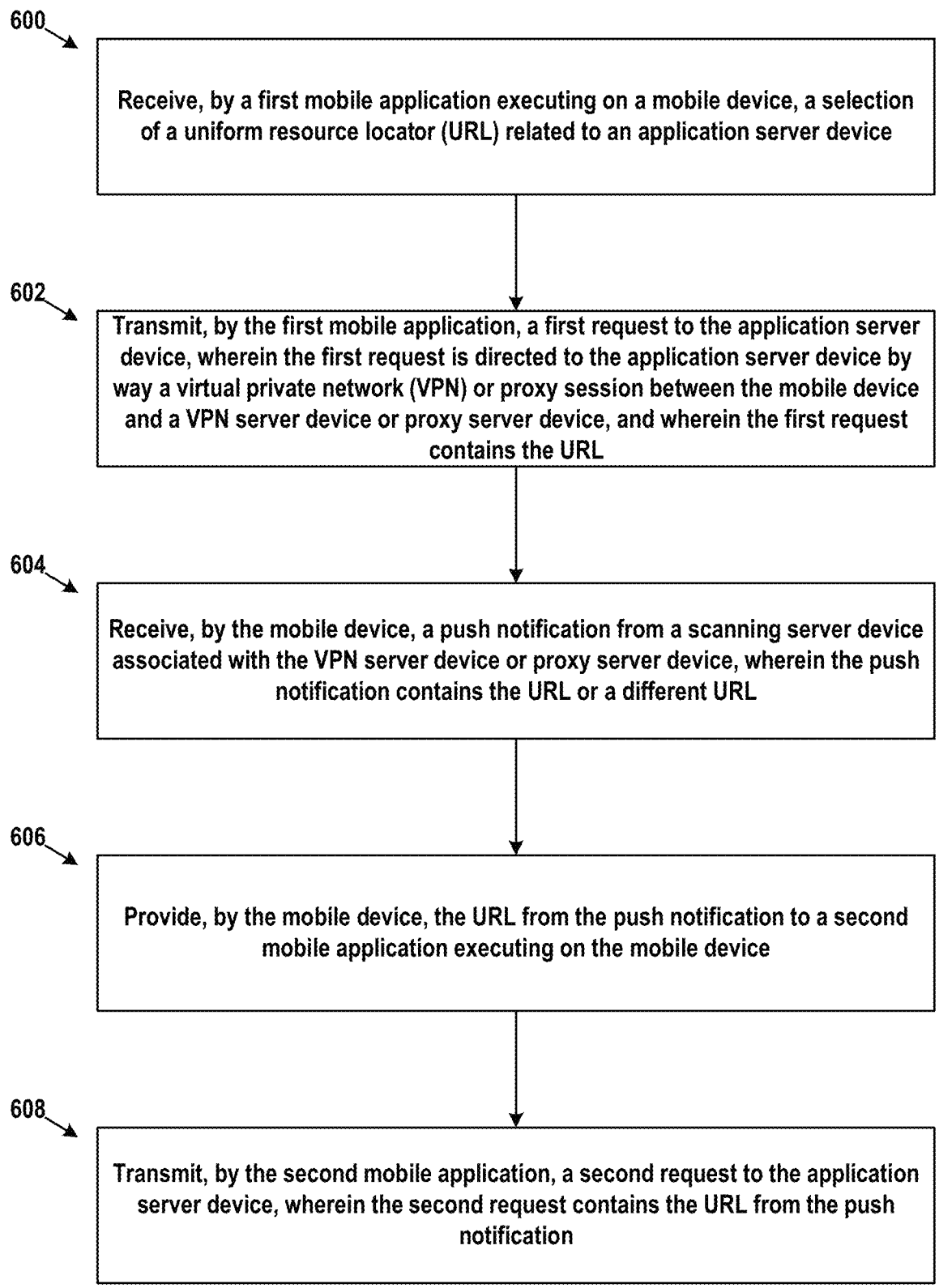
FIGS. 6A, 6B, and 6C are flow charts, in accordance with example embodiments.
Figure 6B:
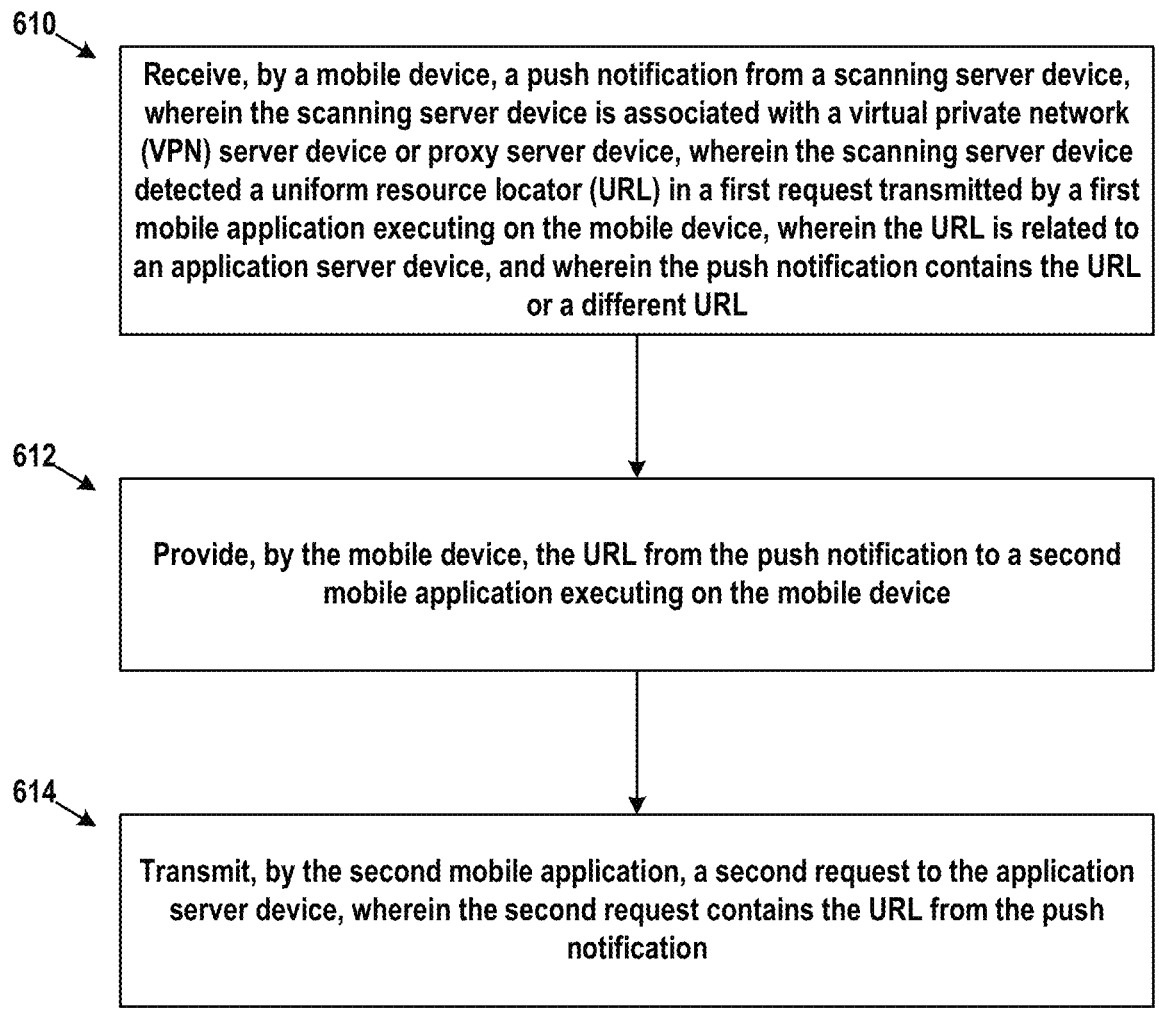
Figure 6C:
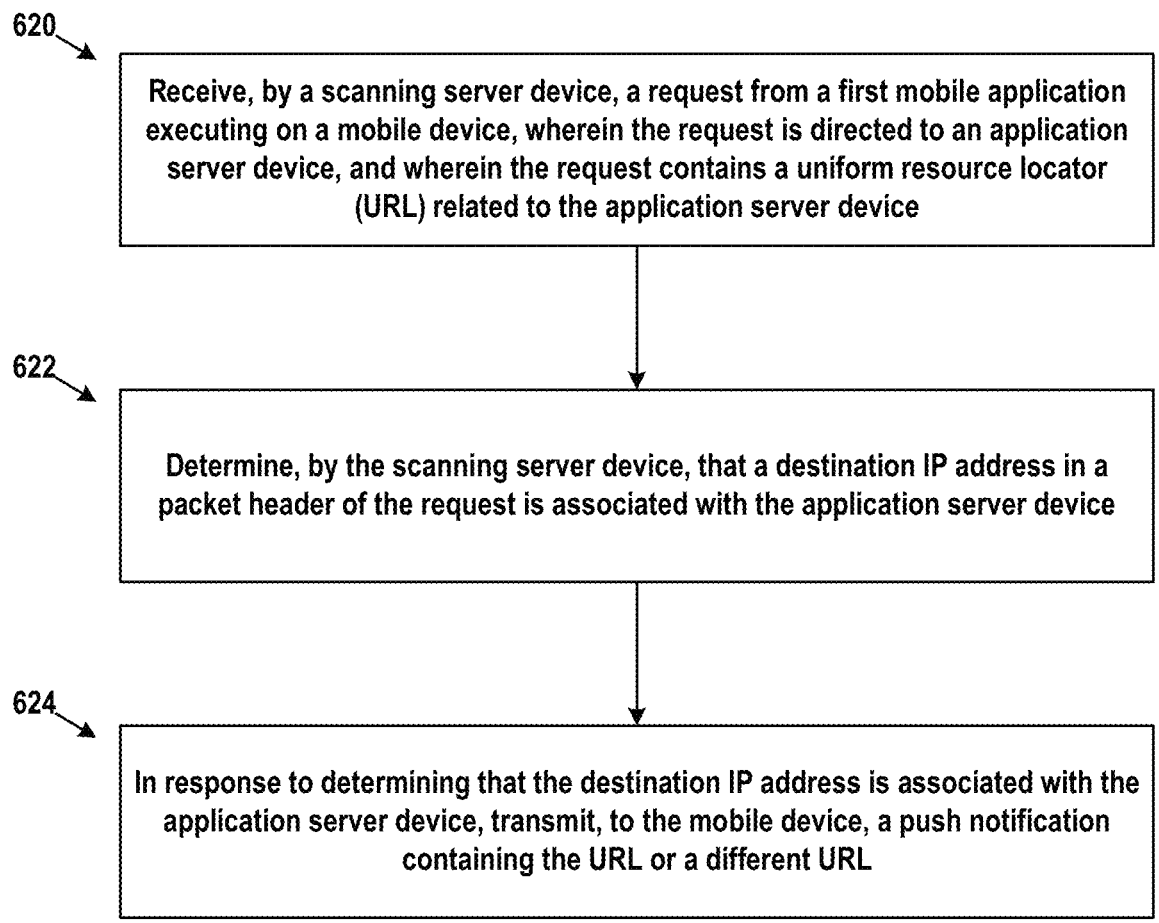

FIG. 5 depicts checking of the list of destination identifiers. In this particular embodiment, destination IP addresses in outbound traffic (from the user's device to a web server) are scanned. If such a destination IP address matches an entry in the list, a push notification is triggered. An alternative embodiment might be to simply log possible savings transactions based on accessed web sites and send a daily or weekly email with savings reports.

Particularly, target IP address 500 is found (matched) in supported IP address array 502 at block 504. This causes the invocation of the push notification process at block 506. Possibly in parallel, through traffic represented by block 508 (from the user's device) is routed to its destination represented by block 510.

In another embodiment, the application can check the location of the mobile device, and if the mobile device is within a predefined distance of a specific brick-and-mortar commerce location, it can trigger a push notification. Doing so may involve a database of geo-coordinates for such locations to cross-reference. No VPN is required for location services, simply enabling location services is all that is required to track the geo-coordinates of a user. Thus, even if a user never enables the VPN, they can still receive push notifications if they are near an ecommerce location, or they can be periodically emailed possible deals.

IV. Management of Push Notifications

The push notifications discussed above can be very useful and desirable for many users. However, they may become redundant or intrusive if sent too often, as they may interrupt the user experience. Accordingly, scanning server 304 and/or mobile device 300 may monitor user behavior with regard to push notifications and other factors so that the volume and nature of these notifications can be tailored.

For example, the number of push notifications transmitted may be based on the user's time spent browsing a particular site or using a particular app, the particular URLs accessed, the geo-location of the mobile device (e.g., as detected by way of GPS), the user's purchasing history, and so on.

In some cases, the user may grant an app on mobile device 300 access to his or her email or banking history. In these cases, the app may scan the user's email and/or banking history for purchase confirmations, invoices, and/or receipts to determine user purchase habits and preferences. Push notifications may be tailored to be relevant to the user based on his or her habits and recent purchases. For example, regularly ordered staples (e.g., coffee, cereal, snacks) might be candidates for offering the user motivation (e.g., a discount or coupon) to purchase more. On the other hand, larger one-time or infrequent purchases (e.g., major appliances, automobiles) might not be candidates for such offers because the user is unlikely to make a similar purchase in the near future.

Moreover, other factors may be taken into account. One might be time of day. For example, it may be beneficial to offer the user a discount for a local restaurant within an hour prior to lunch time or dinner time, especially if the user has accepted and used such offers in the past. Geo-location may also play a role in such an offer. For example, if the user is using a web browser or mapping app to search for pizza and it is 11:45 am, the user might be sent a push notification redirecting the user's mobile device to the web site of a local pizza restaurant that with which a coupon or discount is available and that can be automatically applied during the order process or checkout.

Any and all of these factors and user responsiveness may be used to train a machine learning model (e.g., based on a neural network, decision tree, support vector machine) that predicts likelihoods of success (a user making a purchase) for redirecting the user to various offers. The training process may involve using input data (e.g., IP address, URL, web site domain name, product, time of day, purchase history, and geolocation information) and labelled output data (whether the user responded to a push notification and/or whether the response resulted in a purchase) to train the model. If one or more of these likelihoods exceeds a threshold (e.g., 70% or 80%), the associated offer or offers may be provided to the user in a push notification. In some embodiments, only the offer with the highest likelihood of success is provided.

V. Example Operations

Example operational embodiments are provided below. The processes illustrated by these embodiments may be carried out by a computing device, such as computing device 100, and/or a cluster of computing devices, such as server cluster 200. However, the processes can be carried out by other types of devices or device subsystems. For example, the processes could be carried out by a portable computer, such as a laptop, a mobile, or a tablet device.

These embodiments may be simplified by the removal of any one or more of the features shown therein. Further, these embodiments may be combined with features, aspects, and/or implementations of any of the previous figures or otherwise described herein. Moreover, each of these embodiments may be consider to be related aspects of an overall embodiment, and thus may be combined.

A first example embodiment may involve receiving, by a first mobile application executing on a mobile device, a selection of a uniform resource locator (URL) related to an application server device (block 600). The first example embodiment may also involve transmitting, by the first mobile application, a first request to the application server device, wherein the first request is directed to the application server device by way a virtual private network (VPN) or proxy session between the mobile device and a VPN server device or proxy server device, and wherein the first request contains the URL (block 602). The first example embodiment may also involve receiving, by the mobile device, a push notification from a scanning server device associated with the VPN server device or proxy server device, wherein the push notification contains the URL or a different URL (block 604). The first example embodiment may also involve providing, by the mobile device, the URL from the push notification to a second mobile application executing on the mobile device (block 606). The first example embodiment may also involve transmitting, by the second mobile application, a second request to the application server device or a second application server device, wherein the second request contains the URL from the push notification (block 608). The second request can be transmitted to the application server device without having to pass through the VPN server device or proxy server device, or be scanned by the scanning server device.

In some variations, the scanning server device and the VPN server device (or proxy server device) are implemented as a common device.

In some variations, the second mobile application displays a visual notification on an output component of the mobile device, wherein the visual notification indicates that the second mobile application permits a specific type of transaction with the application server device. For example, the second mobile application may cause a notification to pop up indicating that the user can utilize the second mobile application to access the application server device.

In some variations, the push notification is received by the second mobile application.

In some variations, the push notification is sent based on a time of day or a geo-location of the mobile device.

Some variations may further involve receiving, by the first mobile application and from the application server device, content related to the URL; and displaying, by the first mobile application, the content.

Some variations may further involve receiving, by the second mobile application and from the second application server device, second content related to the URL from the push notification, wherein the second content provides an alternative to the content; and displaying, by the second mobile application, the content.

In some variations, reception of the push notification causes the mobile device to display a notification overlaid atop the content.

A second example embodiment may involve receiving, by a mobile device, a push notification from a scanning server device, wherein the scanning server device is associated with a virtual private network (VPN) server device or proxy server device, wherein the scanning server device detected a uniform resource locator (URL) in a first request transmitted by a first mobile application executing on the mobile device, wherein the URL is related to an application server device, and wherein the push notification contains the URL or a different URL (block 610). The second example embodiment may also involve providing, by the mobile device, the URL from the push notification to a second mobile application executing on the mobile device (block 612). The second example embodiment may also involve transmitting, by the second mobile application, a second request to the application server device or a second application server device, wherein the second request contains the URL from the push notification (block 614).

In some variations, the scanning server device and the VPN server device (or proxy server device) are implemented as a common device.

In some variations, the second mobile application displays a visual notification on an output component of the mobile device, wherein the visual notification indicates that second mobile application permits a specific type of transaction with the application server device.

In some variations, the push notification is received by the second mobile application.

In some variations, the push notification is sent based on a time of day or a geo-location of the mobile device.

Some variations may further involve receiving, by the first mobile application and from the application server device, content related to the URL; and displaying, by the first mobile application, the content.

Some variations may further involve receiving, by the second mobile application and from the second application server device, second content related to the URL from the push notification, wherein the second content provides an alternative to the content; and displaying, by the second mobile application, the content.

In some variations, reception of the push notification causes the mobile device to display a notification overlaid atop the content.

A third example embodiment may involve receiving, by a scanning server device, a request from a first mobile application executing on a mobile device, wherein the request is directed to an application server device, and wherein the request contains a uniform resource locator (URL) related to the application server device (block 620). The third example embodiment may also involve determining, by the scanning server device, that a destination IP address in a packet header of the request is associated with the application server device (block 622). The third example embodiment may also involve, possibly in response to determining that the destination IP address is associated with the application server device, transmitting, to the mobile device, a push notification containing the URL or a different URL (block 624).

In some variations, the request is received from a virtual private network (VPN) server device or proxy server device with which the mobile device has a VPN or proxy session established.

In some variations, the push notification is received by a second mobile application executing on the mobile device.

In some variations, the push notification is sent based on a time of day or a geo-location of the mobile device.

VI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid-state drives, or compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
receiving, by a first mobile application executing on a mobile device, a selection of a uniform resource locator (URL) related to an application server device;
transmitting, by the first mobile application, a first request to the application server device, wherein the first request is directed to the application server device by way a virtual private network (VPN) or proxy session between the mobile device and a VPN server device or proxy server device, and wherein the first request contains the URL;
receiving, by the first mobile application and from the application server device, content related to the URL;
displaying, by the first mobile application, the content;

receiving, by the mobile device, a push notification from a scanning server device associated with the VPN server device or proxy server device, wherein the push notification contains the URL or a different URL;

providing, by the mobile device, the URL from the push notification to a second mobile application executing on the mobile device;

transmitting, by the second mobile application, a second request to the application server device or a second application server device, wherein the second request contains the URL from the push notification;

receiving, by the second mobile application and from the application server device or the second application server device, second content related to the URL from the push notification, wherein the second content is different from the content; and displaying, by the second mobile application, the second content.

2. The computer-implemented method of claim 1, wherein the scanning server device is combined with the VPN server device or proxy server device.

3. The computer-implemented method of claim 1, wherein the second mobile application displays a visual notification on an output component of the mobile device, wherein the visual notification indicates that the second mobile application permits a specific type of transaction with the application server device.

4. The computer-implemented method of claim 1, wherein the push notification is received by the second mobile application.

5. The computer-implemented method of claim 1, wherein the push notification is sent based on a time of day or a geo-location of the mobile device.

6. The computer-implemented method of claim 1, wherein reception of the push notification causes the mobile device to display a notification overlaid atop the content.

7. A computer-implemented method comprising:

receiving, by a first mobile application and from an application server device, content related to a uniform resource locator (URL);

displaying, by the first mobile application, the content;

receiving, by a mobile device, a push notification from a scanning server device, wherein the scanning server device is associated with a virtual private network (VPN) server device or proxy server device, wherein the scanning server device detected the URL in a first request transmitted by the first mobile application executing on the mobile device, wherein the URL is related to the application server device, and wherein the push notification contains the URL or a different URL;

providing, by the mobile device, the URL from the push notification to a second mobile application executing on the mobile device;

transmitting, by the second mobile application, a second request to the application server device or a second application server device, wherein the second request contains the URL from the push notification;

receiving, by the second mobile application and from the application server device or the second application server device, second content related to the URL from the push notification, wherein the second content is different from the content; and displaying, by the second mobile application, the second content.

8. The computer-implemented method of claim 7, wherein the scanning server device is combined with the VPN server device or proxy server device.

9. The computer-implemented method of claim 7, wherein the second mobile application displays a visual notification on an output component of the mobile device, wherein the visual notification indicates that the second mobile application permits a specific type of transaction with the application server device.

10. The computer-implemented method of claim 7, wherein the push notification is received by the second mobile application.

11. The computer-implemented method of claim 7, wherein the push notification is sent based on a time of day or a geo-location of the mobile device.

12. The computer-implemented method of claim 7, wherein reception of the push notification causes the mobile device to display a notification overlaid atop the content.

13. A non-transitory computer-readable medium, having stored thereon program instructions that, upon execution by a mobile device, cause the mobile device to perform operations comprising:

receiving, by a first mobile application executing on the mobile device, a selection of a uniform resource locator (URL) related to an application server device;

transmitting, by the first mobile application, a first request to the application server device, wherein the first request is directed to the application server device by way a virtual private network (VPN) or proxy session between the mobile device and a VPN server device or proxy server device, and wherein the first request contains the URL;

receiving, by the first mobile application and from the application server device, content related to the URL;

displaying, by the first mobile application, the content;

receiving, by the mobile device, a push notification from a scanning server device associated with the VPN server device or proxy server device, wherein the push notification contains the URL or a different URL;

providing, by the mobile device, the URL from the push notification to a second mobile application executing on the mobile device;

transmitting, by the second mobile application, a second request to the application server device or a second application server device, wherein the second request contains the URL from the push notification;

receiving, by the second mobile application and from the application server device or the second application server device, second content related to the URL from the push notification, wherein the second content is different from the content; and displaying, by the second mobile application, the second content.

14. The non-transitory computer-readable medium of claim 13, wherein the scanning server device is combined with the VPN server device or proxy server device.

15. The non-transitory computer-readable medium of claim 13, wherein the second mobile application displays a visual notification on an output component of the mobile device, wherein the visual notification indicates that the second mobile application permits a specific type of transaction with the application server device.

16. The non-transitory computer-readable medium of claim 13, wherein the push notification is received by the second mobile application.

17. The non-transitory computer-readable medium of claim 13, wherein the push notification is sent based on a time of day or a geo-location of the mobile device.

18. The non-transitory computer-readable medium of claim 13, wherein reception of the push notification causes the mobile device to display a notification overlaid atop the content.

* * * * *